(12) United States Patent
Laborde et al.

(10) Patent No.: US 9,483,325 B2
(45) Date of Patent: Nov. 1, 2016

(54) SYNCHRONIZING TIMESTAMP COUNTERS

(71) Applicant: HEWLETT PACKARD ENTERPRISE DEVELOPMENT LP, Houston, TX (US)

(72) Inventors: Louis Laborde, Sunnyvale, CA (US); Spencer A. Frink, Santa Clara, CA (US); Philp Garcia, Saratoga, CA (US); Thierry Fevrier, Gold River, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/419,387

(22) PCT Filed: Sep. 28, 2012

(86) PCT No.: PCT/US2012/057869
§ 371 (c)(1),
(2) Date: Feb. 3, 2015

(87) PCT Pub. No.: WO2014/051615
PCT Pub. Date: Apr. 3, 2014

(65) Prior Publication Data
US 2015/0277989 A1  Oct. 1, 2015

(51) Int. Cl.
| | |
|---|---|
| *G06F 9/46* | (2006.01) |
| *G06F 9/52* | (2006.01) |
| *G06F 11/30* | (2006.01) |
| *G06F 11/16* | (2006.01) |
| *G06F 11/34* | (2006.01) |

(52) U.S. Cl.
CPC ............... *G06F 9/52* (2013.01); *G06F 11/30* (2013.01); *G06F 11/3466* (2013.01); *G06F 11/1675* (2013.01); *G06F 11/3419* (2013.01); *G06F 2201/835* (2013.01); *G06F 2201/86* (2013.01); *G06F 2201/88* (2013.01)

(58) Field of Classification Search
CPC ...... G06F 9/52; G06F 11/3466; G06F 11/30; G06F 11/1675; G06F 2201/88; G06F 2201/835
USPC .......................................................... 718/107
See application file for complete search history.

(56) References Cited

U.S. PATENT DOCUMENTS

| | | | | |
|---|---|---|---|---|
| 5,535,193 A | * | 7/1996 | Zhang ................. | H04L 43/106 370/253 |
| 6,480,966 B1 | * | 11/2002 | Rawson, III ............. | G06F 9/54 710/260 |
| 6,687,756 B1 | * | 2/2004 | Rawson, III ............. | G06F 1/10 713/375 |
| 6,941,482 B2 | * | 9/2005 | Strong .................... | G06F 1/14 370/252 |

(Continued)

OTHER PUBLICATIONS

Marouani et al. "Comparing high resolution timestamps in computer clusters", May 2005, IEEE.*

(Continued)

*Primary Examiner* — Anna Deng
*Assistant Examiner* — Junchun Wu
(74) *Attorney, Agent, or Firm* — Trop, Pruner & Hu, P.C.

(57) ABSTRACT

A technique includes writing a first count value associated with a first timestamp counter to a first memory local to the first timestamp counter. The technique includes writing a second count value associated with a second timestamp counter to a second memory local to the second timestamp counter. The timestamp counters are synchronized based at least in part on the first and second count values.

15 Claims, 3 Drawing Sheets

(56) References Cited

U.S. PATENT DOCUMENTS

| | | | |
|---|---|---|---|
| 8,234,455 | B2 | 7/2012 | Isherwood et al. |
| 8,649,303 | B2* | 2/2014 | Danet .................. G06F 13/385 370/276 |
| 2002/0056133 | A1* | 5/2002 | Fung ...................... G06Q 40/02 725/118 |
| 2004/0024925 | A1 | 2/2004 | Cypher et al. |
| 2004/0117682 | A1 | 6/2004 | Xu |
| 2006/0009927 | A1 | 1/2006 | Osterloh et al. |
| 2007/0239972 | A1* | 10/2007 | Orita ........................ G06F 1/12 712/226 |
| 2008/0294926 | A1* | 11/2008 | Eshraghian ........... H04J 3/0685 713/400 |
| 2009/0222683 | A1* | 9/2009 | Serebrin .................. G06F 1/14 713/375 |
| 2010/0205609 | A1 | 8/2010 | Cypher |
| 2011/0055479 | A1 | 3/2011 | West et al. |
| 2011/0154090 | A1* | 6/2011 | Dixon ................. G06F 11/1658 713/502 |
| 2014/0189265 | A1* | 7/2014 | Kitchin .................... G06F 1/12 711/155 |

OTHER PUBLICATIONS

Huang et al. "Hardware-based Solution of Precise Time Synchronization for Networked Control System", 2011, IEEE.*

Tian et al. "High-Precision Relative Clock Synchronization Using Time Stamp Counters", 2008, IEEE.*

Mink et al. "Multiprocessor Performance-Measurement Instrumentation", Sep. 1990, IEEE.*

Hackenberg, D. et al., Comparing Cache Architectures and Coherency Protocols on X86-64 Multicore SMP, (Research Paper), Proceedings of the 42nd Annual International Symposium on Micro architecture, Dec. 12-16, 2009, pp. 413-422.

International Searching Authority, The International Search Report and the Written Opinion, Apr. 29, 2013, 9 Pages.

Molka, D. et al., Memory Performance and Cache Coherency Effects on an Intel Nehalem Multiprocessor System, (Research Paper), 18th International Conference on Parallel Architectures and Compilation Techniques, Sep. 12-16, 2009, pp. 261-270.

Rolf, T., Cache Organization and Memory Management of the Intel Nehalem Computer Architecture, (Research Paper), 2009.

* cited by examiner

SYNCHRONIZING TIMESTAMP COUNTERS

BACKGROUND

A typical computer may contain multiple timestamp counters, which may be used for such purposes as tracking the execution of software threads and measuring the timing of events in the computer. The timestamp counters may be incremented by hardware. Generally, timestamp counters provide manners of retrieving CPU timing information.

DETAILED DESCRIPTION

Techniques and systems are disclosed herein for purposes of synchronizing timestamp counters in a computer. More specifically, systems and techniques are disclosed herein, which account for hardware source(s) of error that may otherwise be present due to asymmetric memory communication paths of the computer.

Figure 1:
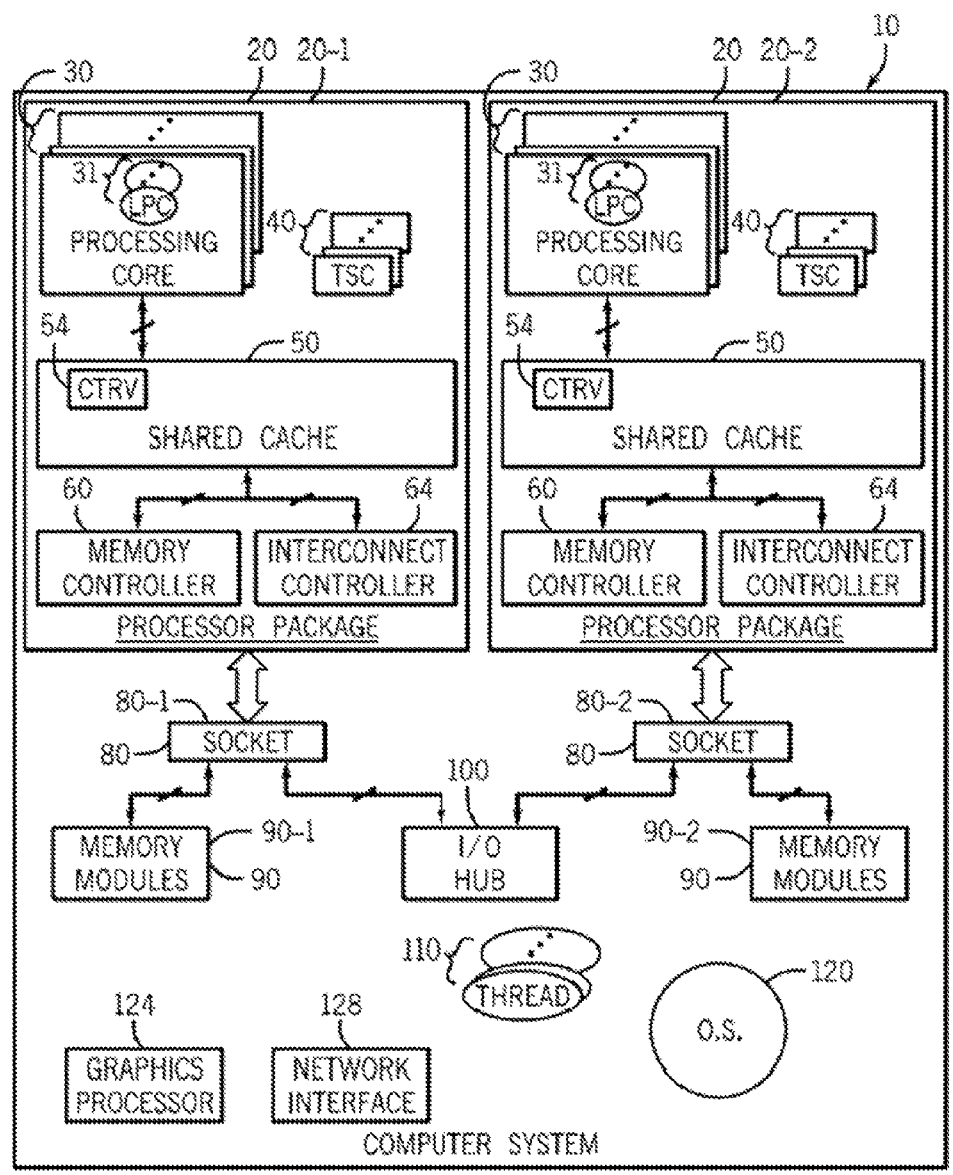
FIG. 1 is a schematic diagram of a computer system according to an example implementation.

As a more specific example, FIG. 1 depicts a "computer," or computer system 10 (a server, a client, a notebook computer, an ultrabook computer, a desktop computer, a tablet computer, a smartphone, and so forth), in accordance with an example implementation. The computer system 10 is a physical machine that is constructed from actual hardware and actual software. In general, the computer system 10 includes physical processor packages 20 (multi-core processor packages, for example), such as processor packages 20-1 and 20-2, which are depicted in FIG. 1 as examples. It is noted that the computer system 10 may include more than two processor packages 20, in accordance with further implementations.

In general, the processor package 20 is a semiconductor package, which is constructed to be mechanically and electrically mounted to a motherboard of the computer system 10 via an associated connector, or socket 80. Thus, as depicted in FIG. 1, the processor package 20-1 is illustrated as being connected to a socket 80-1; and the processor package 20-2 is illustrated as being connected to a socket 80-2. In general, the socket 80 is constructed to receive at least a portion of the processor package 20, which contains the package's electrical contacts, and the socket 80 has mechanical features to secure the processor package 20 to the socket 80.

Thus, the socket 80 contains features to mate with corresponding features of the processor package 20 for purposes of forming the electrical and mechanical connections between the processor package 20 and the motherboard. As a more specific example, in accordance with example implementations, the processor package 20 may be a surface mount package having a land grid array (LGA) for purposes of forming electrical connections with corresponding pins of the socket 80. Other semiconductor packages may be employed, in accordance with further implementations.

The processor package 20 contains one or multiple physical processing cores 30, i.e., processing cores that are constructed to execute machine executable instructions. As depicted in the example of FIG. 1 the processor package 20-1 includes multiple processing cores 30; and the processor package 20-1 also contains multiple processing cores 30.

In accordance with example implementations that are disclosed herein, the computer system 10 employs hyperthreading (HT) technology in which each physical processing core 30 provides an execution "platform" for one or multiple (two, for example) virtual, or logical, processing cores 31. Each physical processing core 30 or logical processing core 31, if implemented is associated with a timestamp counter 40, which is accessible via a dedicated associated hardware register and which may be a virtual counter or physical counter, depending on the particular implementation.

In general, hardware of the computer system 10 is constructed to cause the timestamp counters 40 to monotonically increment at the same rate. Machine executable instructions of the computer system 10, and more specifically, an operating system 120 of the computer system 10, undergoes measures to synchronize the count values of the timestamp counters 40. As described further herein, the count values may be synchronized for purposes of allowing the timestamp counters 40 to be used for such purposes as synchronizing operations of the computer 10 and measuring the timing of events occurring in the computer system 10.

More specifically, although the timestamp counters 40 increment at the same rate, upon the occurrence of certain events of the computer 10, the timestamp counters 40 may be initialized with different count values. For example, when the computer system 10 resets, the timestamp counters 40 some out of reset at different times; and therefore, after a reset, the timestamp counters 40 may store arbitrary count values. Thus, events such as the computer 10 being reset, powered up, resuming from deep sleep state, or additional processor packages 20 being added to the computer system 10 may cause the timestamp counters 40 to be initialized with various arbitrary count values. Therefore, the operating system 120 undergoes a procedure to synchronize the count values of the timestamp counters 40 so that ideally, after the synchronization, all of the timestamp counters 40 share the same count value in common.

As an example, in accordance with some implementations, the operating system 120 uses the following count value synchronization technique, although other techniques may be used, in accordance with further implementations. In phase one, the operating system 120 searches for the timestamp counter 40 that has the highest count value. In this manner, the timestamp counter 40 having the highest count value may be designated as a master counter for purposes synchronizing the other counters 40 so that the other counters 40 do not step back in time (due to the highest count value being used) during the synchronization process. To perform the search for the master timestamp counter, in accordance with example implementations, the logical processing cores 31 of the computer system 10 read their timestamp counter registers and write the corresponding read count values to a designated memory location so that the operating system 120 may review the count values to select the timestamp counter 40 having the highest count value to be the master timestamp counter.

Next in accordance with example implementations, in phase two of the count value synchronization technique, the operating system 120 pairs each of the remaining timestamp counters 40 (one at a time) with the master timestamp counter to synchronize the count value of the paired timestamp counter 40 to the count value of the master timestamp counter. In phase two, the logical processing cores 31 (one or each counter 40 of the pair, for example) exchange count values associated with their timestamp counters 40, and the operating system 120 sets the count value of the paired timestamp counter 40 based on the exchanged values. At the conclusion of phase two, the timestamp counters 40 ideally share a common count value. The asymmetric memory communication paths of the computer 10 involved in the count value exchanges may, however, introduce significant errors in the counter synchronization, it not for the systems and techniques that are disclosed herein.

More specifically, in accordance with example implementations, the computer system 10 employs a non-uniform memory architecture (NUMA), an architecture in which each processor package 20 contains one or more associated memory controllers 60 (one memory controller 60 per package 20 being depicted in FIG. 1, as an example). Therefore, as depicted in FIG. 1, a given processor package 20 uses its associated memory controller(s) 60 for purposes of reading from and writing to memory.

The inclusion of the memory controller(s) 60 in the processor packages 20 according to the NUMA results in asymmetric memory access times, however. More specifically, the memory that is accessible by a given memory controller 60 may be "local" in that the memory controller 60 may generate read and write requests to target memory space associated with one or multiple memory modules 90 that are local to the associated socket 80. However, some memory accesses by a given memory controller 60 may not be local accesses, as these accesses involve read and write requests that are further processed, as appropriate, by the memory controller 60 of another processor package 20.

Therefore, for the example of FIG. 1, the processor package 20-1 has associated local memory modules 90-1 (double data rate (DDR) dynamic random access memory (DRAM) modules, a examples), which am not considered local for the processor package 20-2; and the processor package 20-2 has associated local memory modules 90-2, which are not considered local for the processor package 20-1.

For purposes of accessing non-local memory, the processor package 20 includes an interconnect controller 64 (a Quick Path Interconnect (QPI) controller or a Hyper Transport controller, as examples), which responds to non-local read and write requests for purposes of forwarding these requests to the appropriate memory controller or bridge/hub of the computer system 10. In this manner, the interconnect controller 64 may communicate with other non-processor package components of the computer system 10 via an input/output (I/O) hub 100, as we as communicate with the memory controller 60 of another processor package 20.

The processor package 20 may further include various caches, such as, for example, level one (L1) and level two (L2) caches on each processing core 30 and a level three (L3) cache 50 that is shared among the processing cores 30. Other cache architectures may be employed, in accordance with further implementations.

Due to the above-described asymmetry in the memory communication paths, accesses to a given memory location may vary among the logical processing cores 31, resulting in different memory access latency times. These different memory access latency times may introduce challenges in properly synchronizing the count values of the timestamp counters 40.

More specifically, due to the above-described NUMA in which each processor package 20 has its own associated memory controller(s) 60 and thus, has its local memory, exchanging count values using the logical processing cores 31 of the different processor packages 20 may, without the techniques and systems that are disclosed herein, introduce errors due to asymmetric memory communication paths.

For example, if a given memory location of the computer system 10 is selected for exchanging timestamp count values, then, from a memory access latency time perspective, the memory communication path for a logical processing core 31 of one processor package 20 to the memory location may be "farther" than for a logical processing core 31 of another processor package 20. Thus, for example, if a memory location in the memory modules 90-2 is hypothetically selected for the exchange, a logical processing core 31 of the processor package 20-2 may effectively store its counter value in an internal cache of the processor package 20-2, whereas a logical processing core 31 of the processor package 20-1, for this example exchange, performs a write that involves communications through two interconnect controllers and the memory controller 60 of the processor package 20-2. Due to the potentially different memory access time differences, such a technique to synchronize the timestamp counters 40 may be relatively sensitive to the memory location that is selected for the exchange.

Techniques are disclosed herein for purpose of overcoming memory communication path asymmetry issues that may otherwise arise when timestamp count values 54 associated with different processor packages 20 are exchanged. More specifically, in accordance with example implementations that are disclosed herein, local memories are used to exchange the timestamp count values, in this manner, to exchange timestamp count values for a pair of timestamp counters 40, the logical processing core 31 associated with each timestamp counter 40 writes its associated count value 54 to a local memory (relative to the writing logical processing core 31) and reads the other count value from the other (potentially non-local) memory location Thus, the exchanged timestamp count values are written to local memories (such as local cache lines, as further described herein) and due to this arrangement, the access asymmetries are cancelled.

In accordance with some implementations, the count value exchange may occur in an ordered sequence. For example, the logical processing core 31 writing the master timestamp count value may first write the count value to local memory, and then (after observing through polling, for example), the logical processing core 31 writing the allot timestamp count value may write its other count value to its local memory. This order may be reversed in further implementations.

The operating system 120, depending on the particular implementation, may select one of the two timestamp count values 54 as the value to be used for the initialized/synchronized count value; may select one of the timestamp count values 54 as a base count value from which a common count value may be derived; or may derive a common count value based on both of the count values 54. In accordance with some implementations, the operating system 120 may select the higher timestamp count value. Moreover, in accordance with example implementations, the operating system 120 may adjust the higher timestamp count value to account for error sources involved in the exchanging of the count values and use this adjusted count value as the common count value used to initialize the corresponding timestamp counters 40.

Still referring to FIG. 1, as a more specific example, two timestamp counters 40 that are associated with the processor packages 20-1 and 20-2 are to be synchronized. For this synchronization, a logical processing core 31 of the processor package 20-1 reads its associated timestamp count value 54 from the appropriate local timestamp counter register and writes the count value 54 to its local memory, which effectively involves storing the timestamp count value 54 in a cache line of the shared L3 cache 50 of the processor package 20-1. Likewise, in connection with the time count value exchange, a logical processing core 31 of the processor package 20-2 reads its associated timestamp count value 54 from the appropriate local timestamp counter register and writes the count value 54 to a cache line of the shared L3 cache 50 of the processor package 20-2. The logical processing cores 31 further read the other timestamp count values 54 from the non-local memories to complete the exchange.

Figure 2:
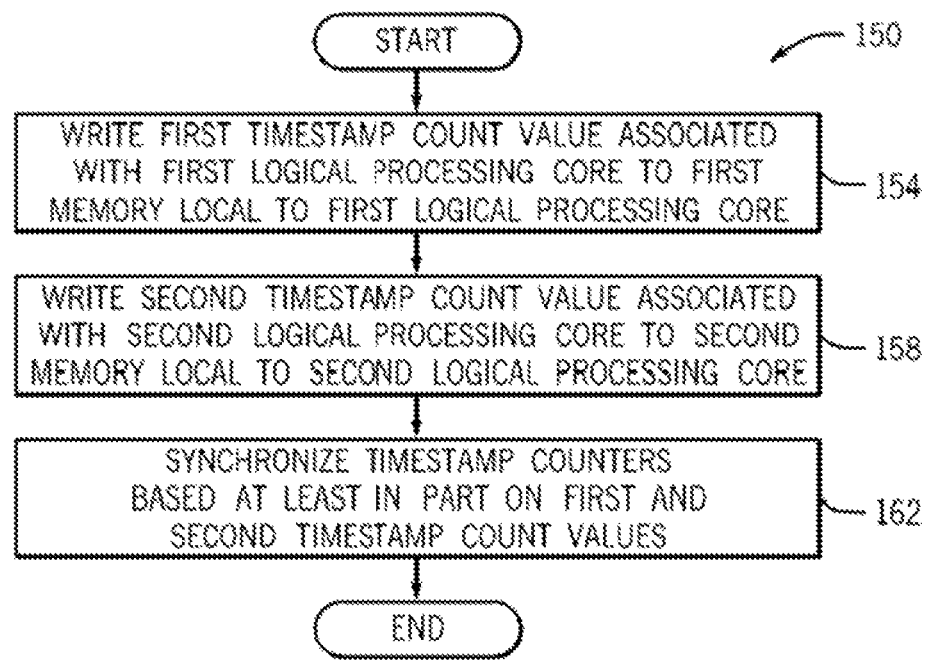
FIG. 2 is a flow diagram depicting a technique to synchronize timestamp counters of a computer according to an example implementation.

Thus, in general, a technique 150 that is depicted in FIG. 2, may be used for purposes of synchronizing timestamp counters in a computer, which has at least first and second logical processing cores that, in turn, have different associated local memories. Referring to FIG. 2 in conjunction with FIG. 1, pursuant to the technique 150, a first timestamp count value that is associated with a first logical processing core is written (block 54) to a first memory that is local to the first logical processing core. A second timestamp count value that is associated with the second logical processing core is written (block 158) to a second local memory that is local to the second logical processing core. Pursuant to the technique 150, the timestamp counters are synchronized based at least in part on the first and second count values, as depicted in block 162.

Figure 3:
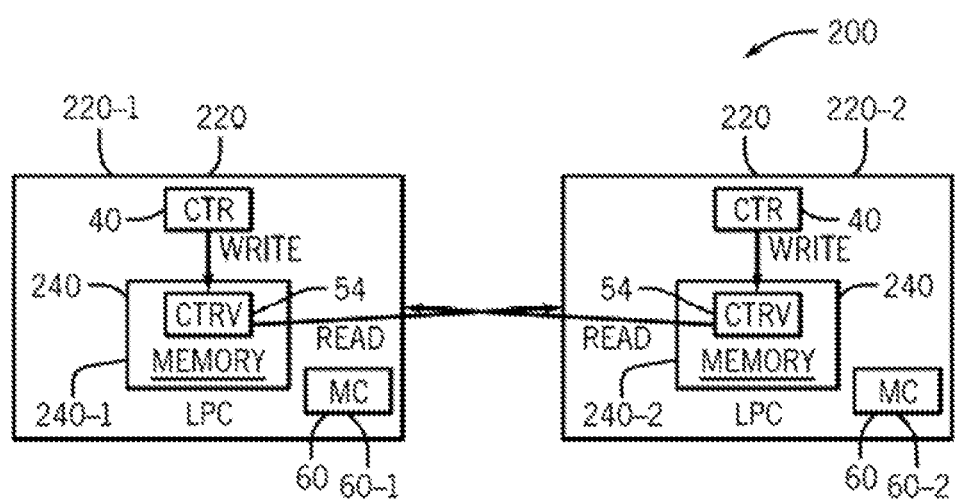
FIG. 3 is a schematic diagram of an apparatus involved in the synchronization of timestamp counters in a computer according to an example implementation.

Therefore, referring to an illustration 200 of FIG. 3, in general, two logical processing cores 220 (logical processing cores 220-1 and 220-2 being depicted in FIG. 3) may synchronize timestamp counters associated with the logical processing cores 228 in the following manner. With this example, the logical processing cores 220 are associated with local memory controllers 60 (memory controllers 60-1 and 60-2, being depicted in FIG. 3). In this regard, each logical processing core 220 stores the associated timestamp count value 54 in its local memory 240 (local memories 240-1 and 240-2 being depicted in FIG. 3) and reads the timestamp count value 54 from the local memory 240 associated with the other logical processing core 220. Based on the exchanged count values, the logical processor cores 220 initialize their associated timestamp counters 40 with a common value that is derived from the exchanged count values 54.

Referring back to FIG. 1, synchronized timestamp counters 40 may be used in a number of different applications. For example, a set of the timestamp counters 40 (two or more than two timestamp counters 40, for example) may be used to synchronize the execution of associated software threads 110 of the computer system 10. In this manner, the threads 110 may be associated with one or more applications that are concurrently being executed by the computer system 10 by multiple logical processing cores 31.

Threads 110 that share common data may be "synchronized" (i.e., the execution timings of the threads 110 are regulated relative to each other) so that the shared data is protected when one of the synchronized threads is accessing the data. The threads that are synchronized may be threads executed by the logical processing cores 31 on the same or different processing cores 30 and/or processor packages 20. The execution timing of a given thread 110 may be regulated, for example, by a count value that is stored by an associated timestamp counter 40 for that thread 110.

Figure 4:
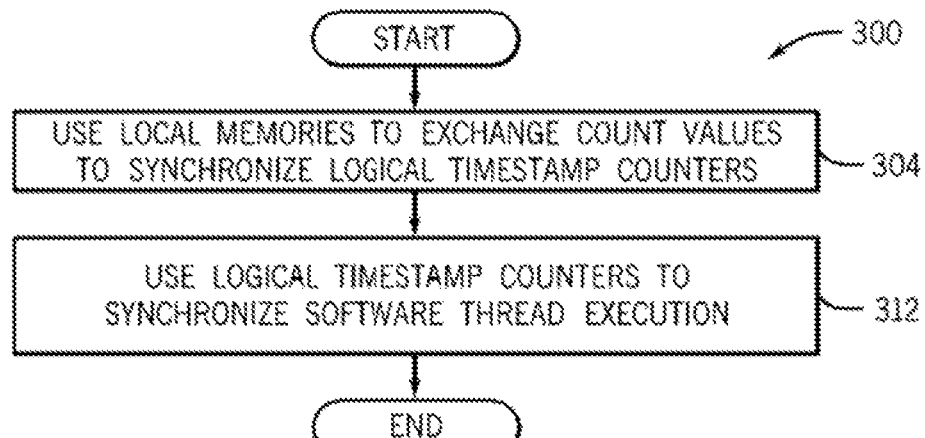
FIG. 4 is a flow diagram depicting a technique to use timestamp counters of a computer for purposes of thread execution synchronization according to an example implementation.

Therefore, for the example implementations in which the timestamp counters 40 are used to synchronize software thread execution, a technique 300 that is depicted in FIG. 4 includes using (block 304) local memories to exchange count values to synchronize timestamp counters and using (block 312) the timestamp counters to synchronize software thread execution.

The timestamp counters 40 may be used for purposes other than synchronizing threads, in accordance with further implementations. For example, in accordance with an exemplary implementation, two timestamp counters 40 may be used to measure the elapsed time between two events in a computer and therefore, may be synchronized to a common value for this purpose. For example, referring to FIG. 1, in accordance with some implementations, a particular logical processing core 31 may read its timestamp counter 40 for purposes of recording a time for a first event, such as, for example, a time when a network packet's received. In response to a later, second event, such as when the network packer's content is copied to a user, another timestamp count value may be recorded. The difference between these two timestamp count values, in turn, represents the duration of time for the computer to process the packet. Without proper counter synchronization, the measured time may be relatively inaccurate.

Figure 5:
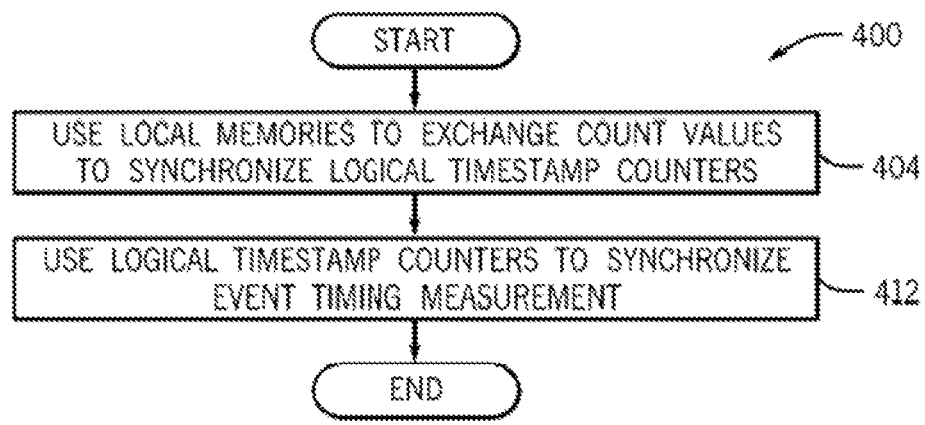
FIG. 5 is a flow diagram depicting a technique to use timestamp counters of a computer for purposes of measuring event timing according to an example implementation.

Thus, referring to FIG. 5, a technique 400 in accordance with example implementations includes using (block 404) local memories to exchange count values to synchronize timestamp counters and using (block 41) timestamp counters to synchronize event timing measurement.

While a limited number of examples have been disclosed herein, those skilled in the art, having the benefit of this disclosure, will appreciate numerous modifications and variations therefrom. It is intended that the appended claims cover a such modifications and variations.

What is claimed is:
1. A method comprising:
writing a first count value associated with a first timestamp counter of a first processor to a first memory local to the first timestamp counter and to the first processor, the first timestamp counter being associated with a first memory controller;
writing a second count value associated with a second timestamp counter of a second processor to a second memory local to the second timestamp counter and to the second processor, the second timestamp counter being associated with a second memory controller other than the first memory controller, the second memory remote to the first timestamp counter and to the first processor, the first memory remote to the second timestamp counter and to the second processor; and
synchronizing the first and second timestamp counters based at least in part on the first and second count values that have been written to the first and second memories, respectively, by at least the first and second timestamp counters exchanging the first and second count values with each other.
2. The method of claim 1, wherein synchronizing the counters comprises synchronizing the counters to synchronize execution of threads.

3. The method of claim 2, further comprising executing the first thread on a first processor associated with a first processor socket and executing the second thread on a second processor associated with a second processor socket.

4. The method of claim 1, wherein writing the first count value comprises storing the first count value in a cache line.

5. The method of claim 1, wherein writing the first count value comprises storing the first count value inside a first processor package and writing the second count value comprises storing the second count value inside a second processor package other than the first processor package.

6. The method of claim 1, wherein writing the first and second count values comprises writing the first and second count values to memory locations of a non-uniform memory architecture (NUMA)-based computer.

7. The method of claim 1, wherein synchronizing the counters comprises synchronizing counters associated with measuring a timing of events occurring in a computer.

8. An apparatus comprising:
 a first logical processing core to write a first count value associated with a first timestamp counter of the first logical processing core to a first memory local to the first timestamp counter and to the first logical processing core; and
 a second logical processing core other than the first logical processing core to write a second count value associated with a second timestamp counter of the second logical processing core to a second memory local to the second timestamp counter and to the second logical processing core,
 wherein the first and second logical processing cores are adapted to synchronize the timestamp counters based at least in part on the first and second count values that have been written to the first and second memories, respectively, by at least the first and second timestamp counters exchanging the first and second count values with each other.

9. The apparatus of claim 8, wherein the first logical processing core is associated with a memory controller local to the first memory and the second logical processing core is associated with another memory controller, the another memory controller being local to the second memory.

10. The apparatus of claim 8, wherein the first logical processing core is adapted to read the second count value from the second memory.

11. The apparatus of claim 8, wherein the first logical processing core is associated with a first processor socket and the second processor is associated with a second processor socket other than the first processor socket.

12. The apparatus of claim 8, wherein the first and timestamp counters are used for at least one of measuring a timing of events in a computer and synchronizing thread execution in the computer.

13. An article comprising a non-transitory computer readable storage medium to store instructions that when executed by a computer cause the computer to:
 write a first count value associated with a first timestamp counter of a first processor to a first memory local to the first timestamp counter and to the first processor, the first timestamp counter being associated with a first memory controller;
 write a second count value associated with a second timestamp counter of a second processor to a second memory local to the second timestamp counter and to the second processor, the second timestamp counter being associated with a second memory controller other than the first memory controller, the second memory remote to the first timestamp counter and to the first processor, the first memory remote to the second timestamp counter and to the second processor; and
 synchronize the first and second timestamp counters based at least in part on the first and second count values that have been written to the first and second memories, respectively, by at least the first and second timestamp counters exchanging the first and second count values with each other.

14. The article of claim 13, the storage medium storing instructions that when executed by the computer cause the computer to write the first count value to the first memory and read the second count value from the second memory.

15. The article of claim 13, the storage medium storing instructions that when executed by the computer cause the computer to synchronize the counters in connection with at least one of synchronizing the measuring of an event timing in the computer and synchronizing the execution of threads in the computer.

* * * * *